United States Patent [19]
Yazaki et al.

[11] Patent Number: 5,210,821
[45] Date of Patent: May 11, 1993

[54] CONTROL FOR A GROUP OF ROBOTS

[75] Inventors: Kazuhiko Yazaki; Hiroyuki Ono, both of Yokohama; Hiroyuki Kanno, Tokyo; Toru Nishiyama, Ayase; Minoru Nomaru, Yokohama, all of Japan

[73] Assignee: Nissan Motor Company, Yokohama, Japan

[21] Appl. No.: 723,724

[22] Filed: Jun. 20, 1991

Related U.S. Application Data

[63] Continuation of Ser. No. 329,711, Mar. 28, 1989, abandoned.

[30] Foreign Application Priority Data

| Mar. 28, 1988 | [JP] | Japan | 63-71775 |
| Mar. 28, 1988 | [JP] | Japan | 63-71782 |
| Jun. 13, 1988 | [JP] | Japan | 63-143482 |

[51] Int. Cl.$^5$ ......................... B05B 19/00; G06F 9/00
[52] U.S. Cl. .................................. 395/83; 395/84; 395/87
[58] Field of Search ............. 364/513, 200, 900, 131, 364/133, 473; 395/84, 89, 83

[56] References Cited

U.S. PATENT DOCUMENTS

| 4,191,913 | 3/1980 | Arnold et al. | 318/663 |
| 4,256,947 | 5/1981 | DeCandia | 219/158 |
| 4,641,269 | 2/1987 | Japenga et al. | 364/473 |
| 4,685,947 | 8/1987 | Liska et al. | 364/473 |
| 4,691,905 | 9/1987 | Tamura et al. | 269/45 |
| 4,698,766 | 10/1987 | Entwistle et al. | 395/82 |
| 4,705,552 | 11/1987 | Liska et al. | 364/133 |
| 4,725,965 | 2/1988 | Keenan | 395/89 |
| 4,833,624 | 5/1989 | Kuwahara et al. | 395/84 |
| 4,887,014 | 12/1989 | Kato | 395/83 |
| 4,891,765 | 1/1990 | Hatori et al. | 395/84 |
| 4,935,863 | 6/1990 | Calvas et al. | 364/133 |
| 4,973,215 | 11/1990 | Karlen et al. | 414/729 |

FOREIGN PATENT DOCUMENTS 62-110581 5/1987 Japan.

OTHER PUBLICATIONS

European Patent Application No. 0 067 446, Jun. 15, 1982.
IEEE Network: The Magazine of Computer Communications, vol. 2, No. 3 May 1988, pp. 23–31.
Control Engineering, vol. 33, No. 9, Sep. 1986, pp. 144–147.
Manufacturing Technology International, No. 1, 1987 pp. 171–173.
IBM Technical Disclosure Bulletin, vol. 30, No. 4, Sep. 1987, pp. 1692–1695.
Werkstattstechnik, Zeitschrift Fur Industrielle Fertigung, vol. 77, No. 8, Aug. 1988 pp. 441–444.

Primary Examiner—Michael R. Fleming
Assistant Examiner—Ayaz R. Sheikh

[57] ABSTRACT

A control for robots wherein a plurality of control units are connected in a hierarchical structure including a plurality of ranks including the lowest rank, and the robots subordinate to the control units belonging to the lowest rank.

5 Claims, 15 Drawing Sheets

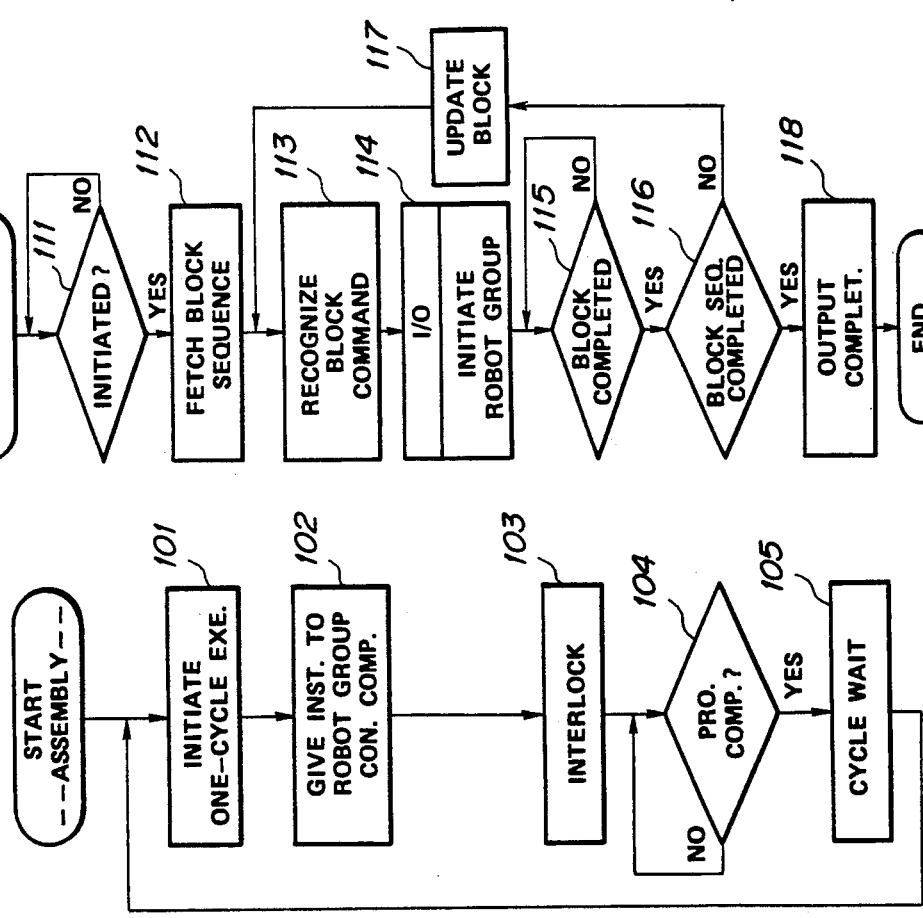
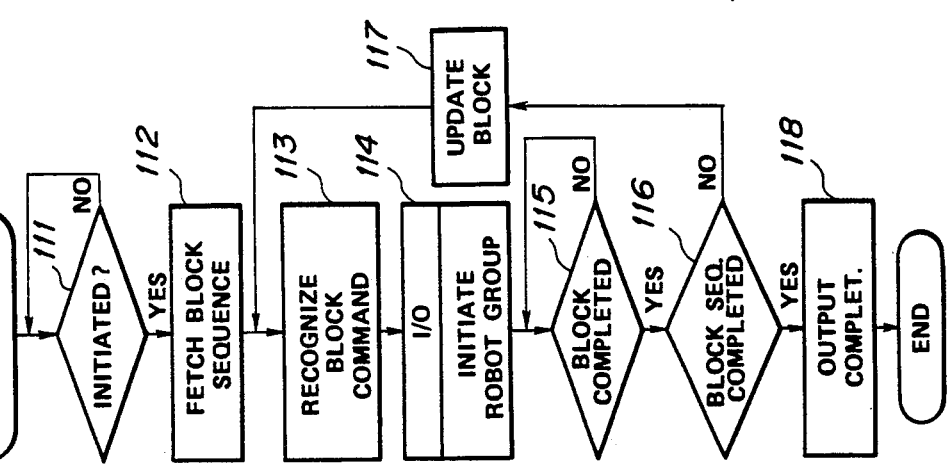
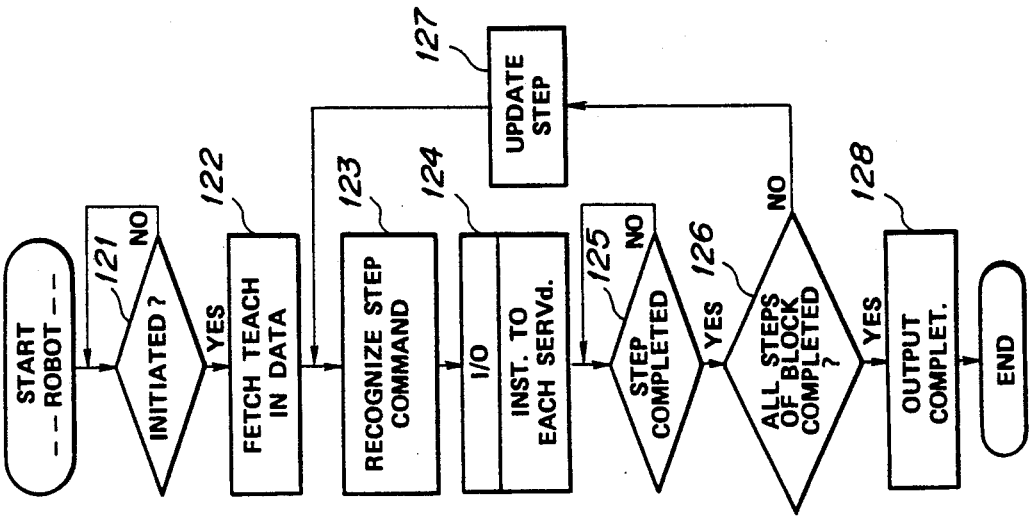

FIG.15
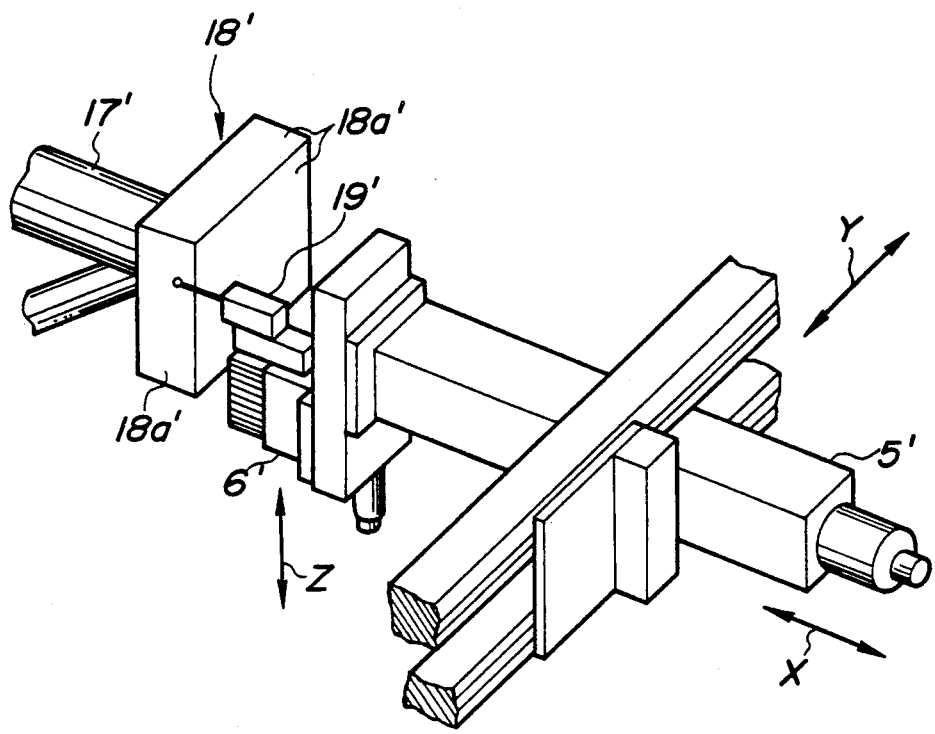
FIG.16  FIG.17
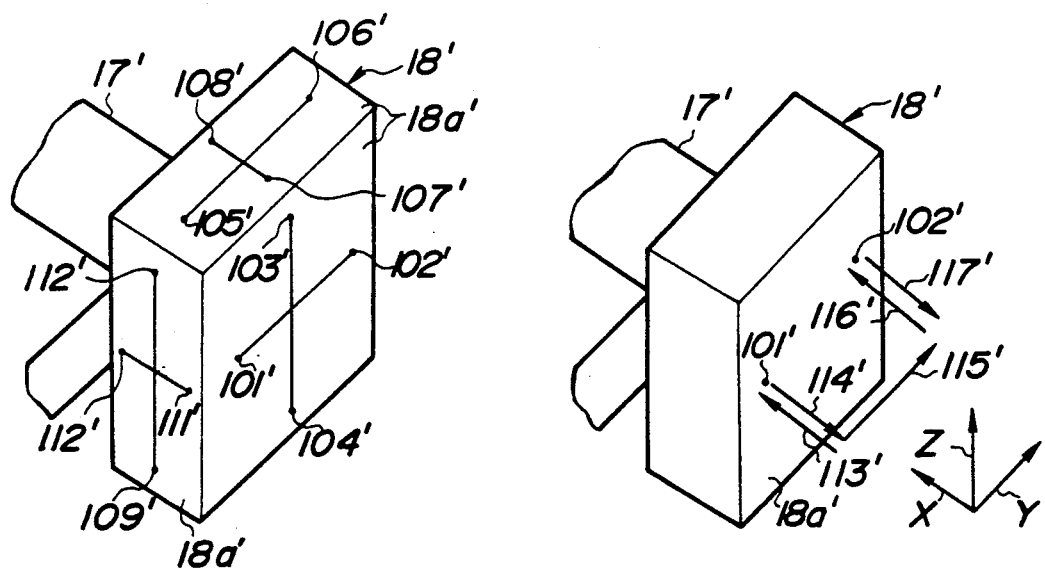

CONTROL FOR A GROUP OF ROBOTS

This is a continuation of application Ser. No. 07/329,711, filed Mar. 28, 1989, now abandoned.

BACKGROUND OF THE INVENTION

The present invention relates to a control for a group of robots, each having a plurality of mobile axis drive mechanisms, which are assigned to perform a variety of functions to assemble a product, and more particularly to a control arrangement which makes it easy to locate malfunctions developing in the robots.

Japanese Patent First Publication No. 62-110581 discloses an apparatus for assembling a vehicle body. According to this known apparatus, a plurality of robots, each having a plurality of mobile axis drive mechanisms, are arranged on a vehicle body assembling stage in a vehicle body assembly line. These robots are assigned to perform function to locate a main floor panel, and a plurality of vehicle body panels like body side panels, and function to spot weld these panels.

In controlling the plurality of robots, it is the conventional practice to control all of the actions of each robot in parallel by a single computer. This control arrangement has a problem that it takes a great number of steps and thus time to locate where a trouble or malfunction has developed.

An object of the present invention is to provide a control arrangement whereby it is easy to locate where a trouble or malfunction has developed.

SUMMARY OF THE INVENTION

According to one aspect of the present invention, there is provided a control system comprising:
a plurality of robots;

BRIEF DESCRIPTION OF THE DRAWINGS

FIGS. 6(a), 6(b), and 6(c) are flow diagrams;

FIG. 15 is a perspective view of a portion of a robot in relation to an instrument block;

FIG. 16 is a fragmentary view of the block used to illustrate locations of metering points; and FIG. 17 is the same view to FIG. 16, illustrating how to move the robot in metering process.

DETAILED DESCRIPTION OF THE INVENTION

Figure 1:
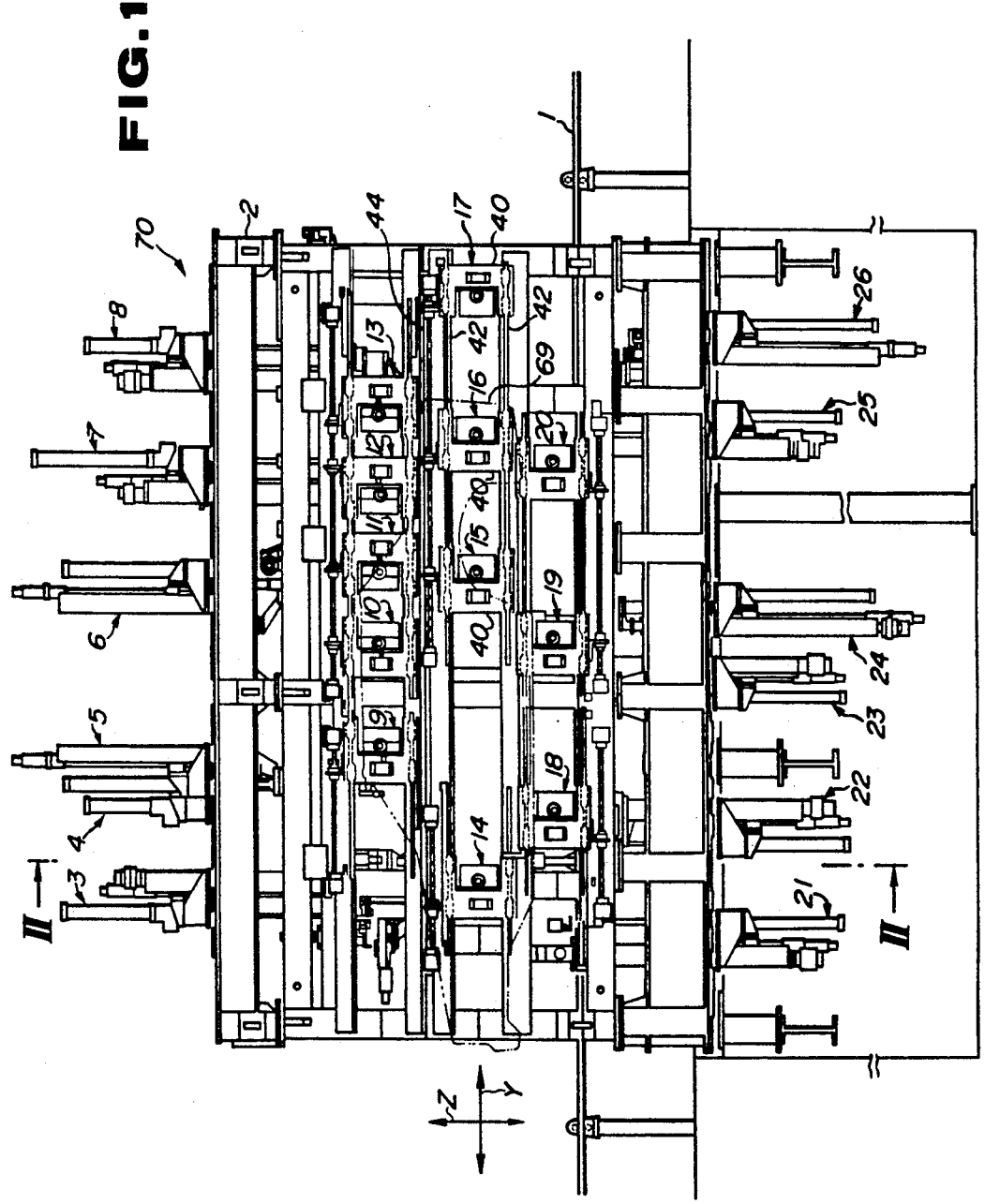
FIG. 1 is a side elevation of a main body assembling apparatus where one embodiment of a method of controlling a group of robots is applied.
Figure 2:
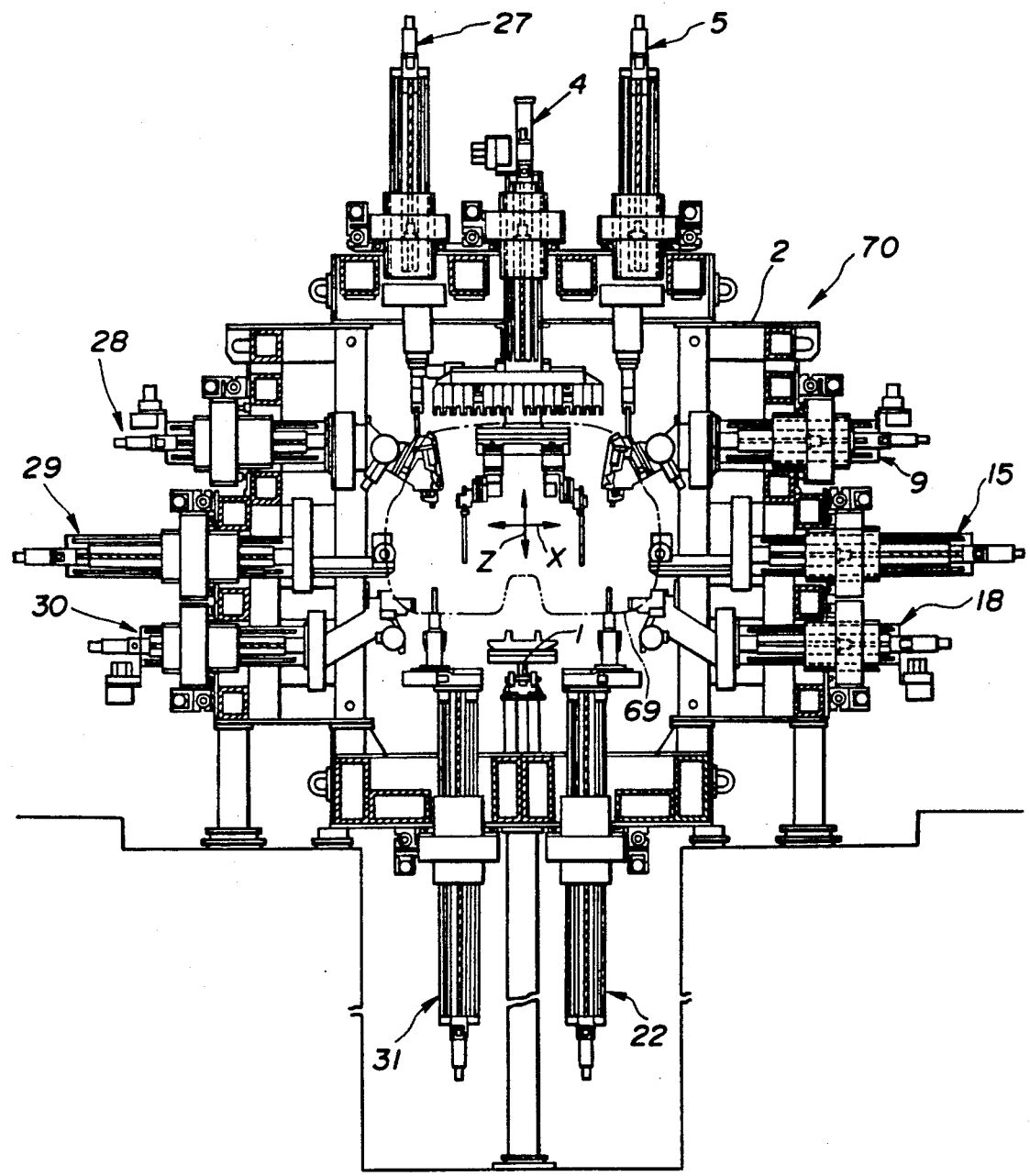
FIG. 2 is a cross section through the line II—II in FIG. 1.

Referring to FIGS. 1 and 2, a main body assembling apparatus is generally denoted by the reference numeral 70. There is shown a shuttle bar 1 which is so constructed and arranged as to deliver all of the body panels to be assembled to form a vehicle main body to a station and then take out the assembled product. Arranged to cover the shuttle bar 1 is a frame 2 with a rectangular cross-section. The frame 2 has two parallel spaced side structures extending along the shuttle bar 1, an upper structure and a lower structure. The upper and lower structures extend along the shuttle bar 1 and interconnect the side structures to form the rectangular cross-section. The apparatus also includes a group of a great number of orthogonal type robots which are divided into a plurality of sub-groups, each sub-group being arranged in one of the four structures of the frame 2. In FIGS. 1 and 2, only a portion of such robots are illustrated at 3 to 31.

Figure 3:
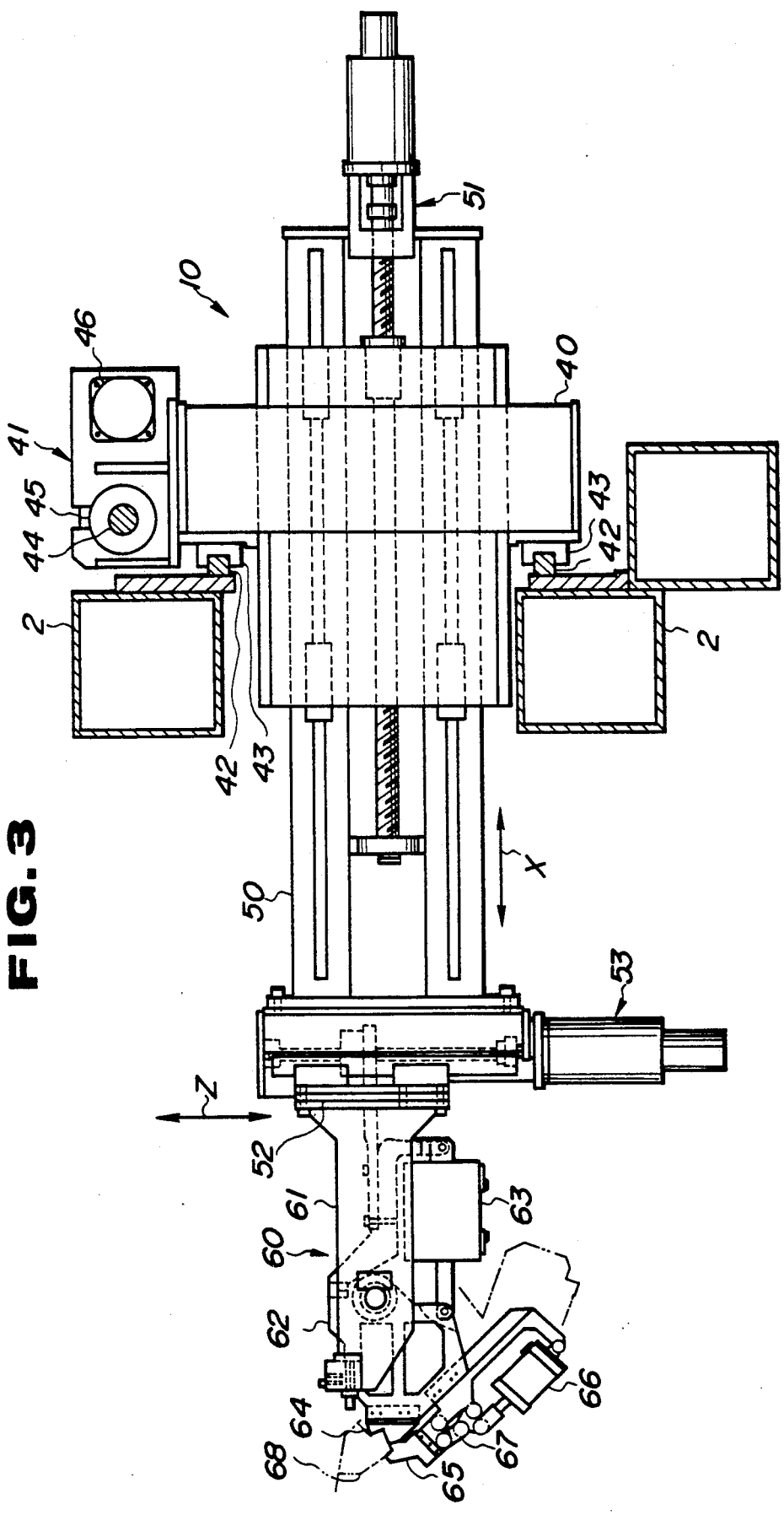
FIG. 3 is a fragmentary cross section of FIG. 1 showing a side roof rail positioning robot.

All of the robots used in this apparatus are substantially identical in construction. Referring to FIG. 3, there is described, as a typical example, a robot 10 constructed and arranged as to locate a side roof rail portion of a body side panel. As shown in FIG. 3, the robot 10 includes a base 40 which is movable along a Y-axis, i.e., an axis normal to the drawing in FIG. 3, and a base drive mechanism 41 for driving the base 40 to move along the Y-axis. The Y-axis extends as the shuttle bar 1. An arm 50 is movable relative to the base 40 along a X-axis and an arm drive mechanism 51 is provided to drive the arm 50 along the X-axis. A mobile bracket 52 is movable relative to the arm 50 in a Z-axis, and a mobile bracket drive mechanism 53 is provided to drive the mobile bracket 52 to move in the Z-axis.

Touching upon the structure of each of the base drive mechanism 41, arm drive mechanism 51 and mobile bracket drive mechanism 53, the movement along the corresponding axis is accomplished by a guide rail and a slider guided by the guide rail, and a worm shaft driven to rotate by a servo motor and a nut engaged with the worm shaft. For example, in the case of the robot 10 shown in FIG. 3, a guide rail 42 is fixedly secured to the frame 2, while a slider 43 is fixedly secured to the base 40 and guided by the guide rail 42. A worm shaft 44 is fixedly mounted on the frame 2, while a nut 45 is rotatably supported by the base 40 and threadedly engaged with the worm shaft 44. The nut 45 is drivingly connected with a servo motor 46 mounted on the base 40.

In the case of the robot 10 shown in FIG. 3, the mobile bracket 52 has mounted thereon a positioning device 60 which can cope with a plurality kinds of works. This positioning device 60 includes a holder 61 fixedly secured to the mobile bracket 52, a plurality of gauge posts 62 pivotably mounted on the holder 61, and a plurality of thin-type cylinders 63. Each of the gauge posts 62 is swingable by the corresponding thin-type cylinder 63 between a working position as illustrated by the fully drawn line and a waiting position as illustrated by the phantom line. Each of the gauge posts 62 has fixed thereto a gauge plate 64 having a configuration mating with the shape of a work, and also has a clamp member 65 pivotably mounted thereon. The clamp member 65 is swingable by a thin-type cylinder 66 mounted on the gauge post 62. The cylinder 66 drives the clamp member 65 via a toggle mechanism 67.

With the robot 10 constructed as above, among all one gauge plate 64 corresponding to the shape of a work 68 illustrated by the phantom line in FIG. 3 is selected and move to a working position thereof by means of the corresponding cylinder 63, thus positioning the work 68. Then, the clamp member 64 is actuated by the corresponding cylinder 66 to move to a position where the clamp member 64 and the gauge plate 64 interpose the work 68 therebetween.

Therefore, according to this robot 10, a variety of different shaped side roof rails can be positioned accurately.

The other robots of the main body assembling apparatus 70 may have different positioning devices as situation demands which are capable of coping with a variety of different shaped works, or spot welding guns. As different from the positioning device as described referring to FIG. 3, a positioning device may be used which include a gauge assembly which can change its contour to cope with different shaped works. See U.S. Pat. No. 4,691,905 (Tamura et al.) in this regard.

Referring back to FIGS. 1 and 2, the sub-group of robots arranged in the lower structure of the frame 2, including for example the robots 21, 22, 23 and 25, are assigned to perform a function to position a main floor panel of a main body. The sub-group of robots including the above mentioned robot 10 which are arranged in both side structures of the frame 2 are assigned to perform a function to position left and right body side panels. The sub-group of robots which are arranged in the upper structure of the frame 2 and include for example the robots 3, 5, 6, 7 and 8 are assigned to perform functions to position roof rails or air box or a rear panel or the like. On the other hand, the robots with a weld gun, for example, the robots 4, 24, are assigned to perform a function to spot weld a variety of portions where the body panels are to be secured to each other.

In order to let the group of robots perform a large variety of different functions listed above, all of the robots are classified in accordance with the function or functions which each of the robots is assigned to perform into a plurality of sub-groups, namely a floor group of robots which perform a function to position a main floor panel, a body side group of robots which perform a function to position body side panels, and a weld group of robots which perform a function to spot weld panels of a vehicle main body. The groups of robots so classified are controlled by a control system as shown in FIG. 4.

Figure 4:
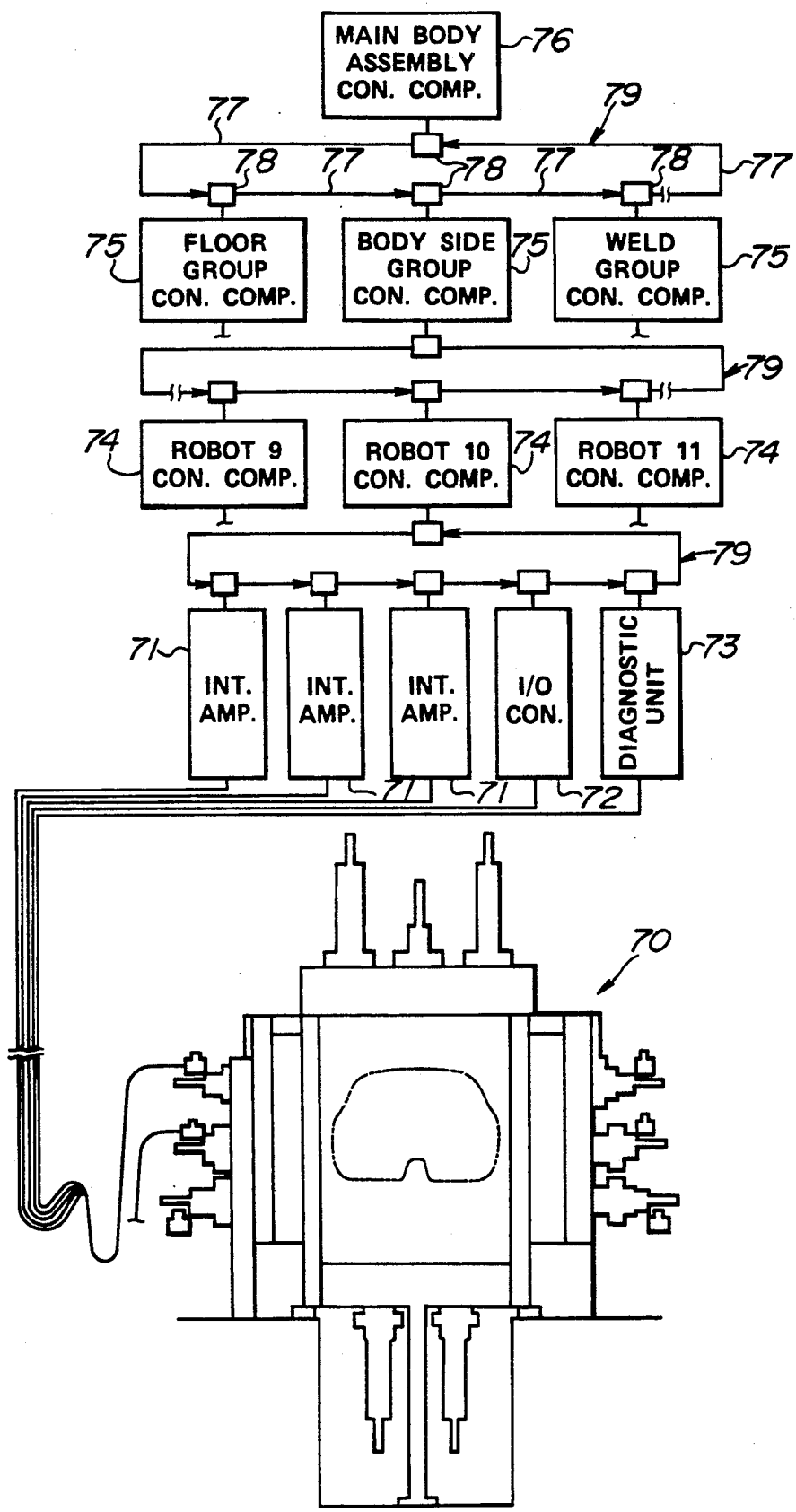
FIG. 4 is a block diagram of a portion of a control for robots as being connected to the side roof rail positioning robot.

Referring to FIG. 4, for each of the robots, there are provided intelligent amplifiers 71 for the mobile axis drive mechanisms, respectively. An input output (I/O) controller 72, a diagnostic unit 73, and a robot control computer 74 are provided for each robot. For those robots belonging to the same functional group, a group control computer 75. Finally, a single assembly control computer 76 is provided for all of the group control computers 75. Via telecommunication cables, the intelligent amplifiers 71 are connected with the servo motors of the corresponding mobile axis drive mechanisms of each robot. Each of the I/O controllers 72 is connected with a solenoid operated air valve for activating an air cylinder for a hand of the corresponding robot via a telecommunication cable. Each of the diagnostic units 73 is connected with a strain sensor and a vibration sensor of the corresponding robot via a telecommunication cable. Each of the robot control computers 74 is connected with the intelligent amplifiers 71, I/O controller 72 and diagnostic unit 73 of the corresponding robot via a loop-type serial data network 79. Each of the group control computers is connected with those robot control computers 74 which are provided for the robots belonging to the same functional group via a loop-type serial data network 79. The assembly control computer 76 is connected with all of the group control computers 75 via a loop-type serial data network 79.

Describing specifically taking the above-mentioned robot 10 as an example, three intelligent amplifiers 71 are provided for the base drive mechanism 41, arm drive mechanism 51 and mobile bracket drive mechanism 53, respectively. There is provided one I/O controller 72 for the positioning device 60. There is provided one diagnostic unit 73 for the robot 10. The three intelligent amplifiers 71, I/O controller 72 and diagnostic unit 73 are connected with the robot control computer 74 which is in turn connected via serial data network 79 with a body side group computer 75 which is connected via a serial data network 79 with the assembly control computer 76. Each of the serial data networks 79 is constructed of an optical local area network (OLAN) including optical fiber cable 77 and optical transreceivers 78. In this embodiment, the loop-type networks are used, but networks of the star-type or the bus-type may also be used.

Figure 5:
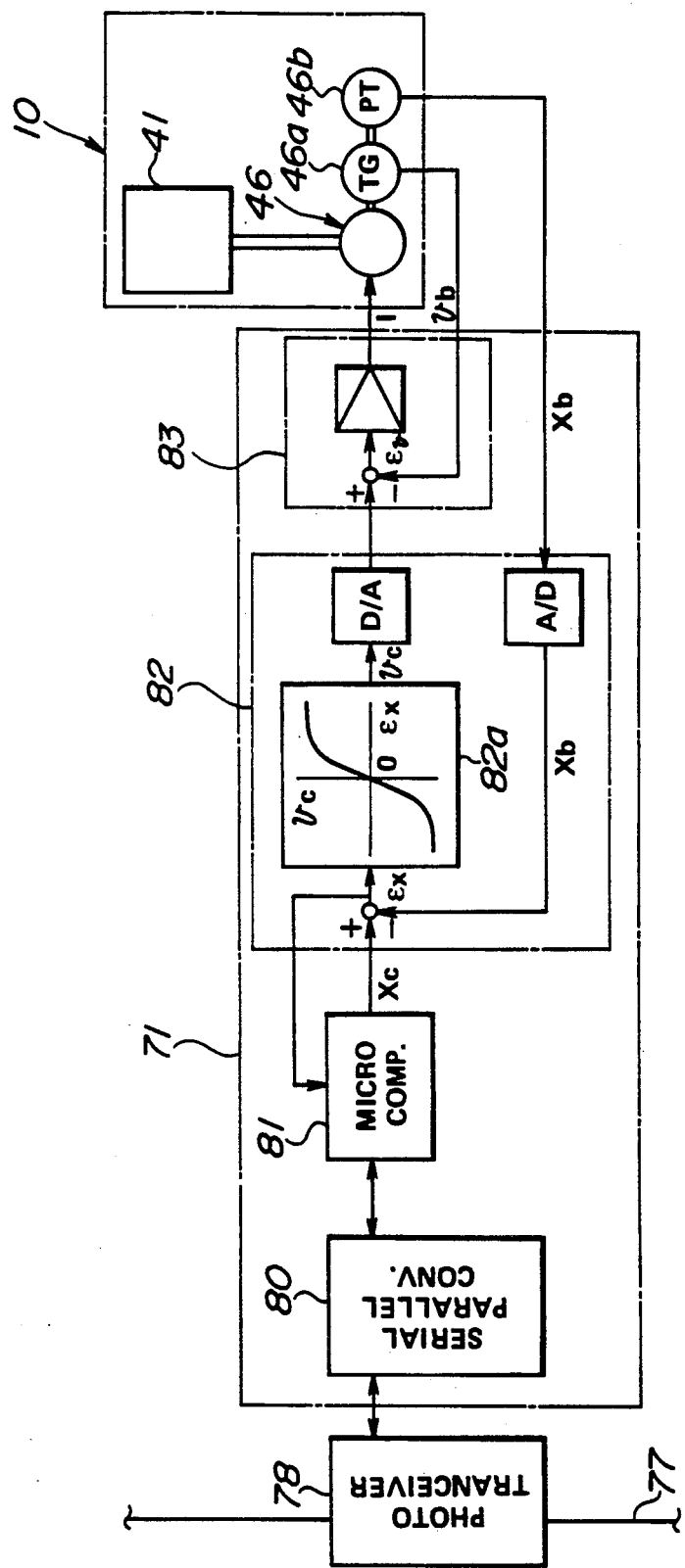
FIG. 5 is a block diagram of an intelligent amplifier as being connected to the side roof rail positioning robot.

Referring to FIG. 5, the intelligent amplifier 71 includes a serial parallel converter 80, an execution microcomputer 81, a servo controller 82, and a servo amplifier 83. The microcomputer controls telecommunication and the servo controller 82. The servo controller 82 includes a deviation-speed converter 82a which receives a position deviation $\epsilon_x$ between a target position $x_c$ of the servo motor 46 of the base drive mechanism 41 and an actual position $x_b$ thereof and outputs a target speed $v_c$ at which the servo motor 46 should rotate. The conversion by the converter 82a is such that the target speed $v_c$ varies in proportion to the input deviation $\epsilon_x$ until it reaches one of two limit values with the same absolute value but different signs. The target speed $v_b$ is supplied to a D/A converter where the digital to analog conversion is effected and the analog signal is supplied to a servo amplifier 83. At the servo amplifier 83, a speed deviation $\epsilon_v$ between the analog version of the target speed $v_c$ and the actual speed $v_b$ at which the servo motor 46 rotates is amplified to give a drive current I indicative of the result of this amplification. This drive current I is supplied to the servo motor 46 of the base drive mechanism 41.

The servo motor 46 of the robot 10 is operated on this drive current I. The operation of the servo motor 46 is detected by a tachogenerator 46a. The tachogenerator 46a generates the actual vehicle speed $v_b$. The actual position $x_b$ which the servo motor 46 takes is detected and generated by a potentio meter 46b. Since the position and the speed of the base 40 correspond to those of the servo motor 46, the actual position $x_b$ and the actual speed $v_b$ are indicative of those of the base 40.

As will now be appreciated, the servo controller 82 and the servo amplifier 83 execute feedback control of the servo motor 46. When the base 40 has displaced to the target position $x_c$, the position deviation $\epsilon_x$ becomes zero. When it detects this fact that the position deviation $\epsilon_x$ is equal to zero, the execution microcomputer 81 judges that the intended movement of the base 40 has completed.

The I/O controller 72 includes a serial parallel converter and an execution microcomputer which are similar to their counterparts in the above-mentioned intelligent amplifier 71. It has an interface via which output signals are supplied to the solenoid operated air valves and an interface via which input signals are supplied to the microcomputer from switches including microswitches and/or magnet operated switches. The execution microcomputer controls the interfaces and telecommunication.

The diagnostic unit 73 includes a serial parallel converter and an execution microcomputer which are similar to their counterparts in the intelligent amplifier 71. It includes an analog digital converter which converts the analog signals of the sensors to digital signals, respectively.

All of the three intelligent amplifiers 71 are identical in construction and thus compatible. All of the I/O controllers 72 are identical in construction and thus compatible, too. All of the diagnostic units 73 are identical in construction and thus compatible too.

The control computers 74 and 75 are identical in construction and thus compatible. They include two serial parallel converters which are similar to the counterpart in the intelligent amplifier 71, an execution microcomputer which is similar to the counterpart in the intelligent amplifier 71, and an operator control panel.

The assembly control computer 76 includes a single serial parallel converter which is similar to the counterpart in the intelligent amplifier 71, an execution microcomputer which is similar to the counterpart in the intelligent amplifier, and an operator control panel which is similar to the counterpart in the above-mentioned control computer 74 or 75. Thus, if a second serial parallel converter is added, the assembly control computer becomes identical in construction to the control computers 74 and 75, and thus become compatible.

As previously described, according to this embodiment, the control apparatus is made up of and divided into an assembly control, a robot group control, a robot control, and a mobile axis drive mechanism and hand control.

In this embodiment, the work necessary for assembling the main body is divided into different functions, such as a function to position the main floor panel, a function to position the roof rail, and a welding function. The operation to perform each of the above-mentioned functions is divided into different blocks, each including a basic operation, such as a block to perform switching in response to different types of vehicle bodies, a block to approach the vehicle body parts, a block to position the vehicle body parts, a block to step back from the vehicle body, and a block to restore the rest position. The operation of each of the above-mentioned blocks is divided into different step operations of one or each of mobile axis drive mechanisms or hands of each robot.

The assembly control computer 76 operates in a manner as illustrated in FIG. 6(a). When it is requested by the vehicle body line controller to initiate execution of one-cycle operation of temporary assembling of the main body at a step 101, the assembly control computer 76 gives instructions to the robot group control computers 75, respectively, requesting them to initiate execution of jobs at a step 102. While the robot group control computers 75 are performing their jobs in a parallel manner, the assembly control computer 76 controls interlock among the basic operation performing blocks at a step 103. When it confirms completion of all of the jobs of the programs by the robot group control computers 75 at a step 104 upon receiving signals from all of the robot group control computers 75, the assembly control computer 76 proceeds to a step 105 and becomes a cycle-operation waiting state to wait for input of next cycle-operation instruction from the vehicle body assembly line computer. The assembly control computer 76 executes supervisory program to supervise operations of the robot group computers 74, such as check-up of interlock after execution of jobs at the step 103.

Referring to FIG. 6(b), when it is requested by the assembly control computer 76 to initiate one-cycle operation, each of the robot group control computers 75 fetches block sequence instructions containing scheduling of the above-mentioned operation blocks out of the memory at a step 112. At steps 113, 114, 115, 116, and 117, the robot group control computer 74 recognize commands specified in each of the blocks. When the command requests interlock with another robot group computer, the I/O controller 72 is activated to perform the interlock necessary via the assembly control computer 76. When the command requests execution of basic operation, the robot group computer 75 gives instruction to the robot control computer 74, requesting same to initiate jobs specified in the basic operation block. While the robot control computers 74 operate in a parallel manner, the robot group control computer 75 controls interlock between step operations performed by them. When it recognizes completion of operations specified in the block by all of the robots belonging to the group under supervision, the robot group computer 75 proceeds to handle recognition of command specified in the next block. All the necessary blocks are fetched out of the memory one after another in accordance with the block sequence and recognized one after another. After the handling of all of the blocks is completed in accordance with the block sequence, the robot group computer 75 proceeds to a step 118 and generates a task completion signal to be supplied to the assembly control computer 76. The robot group computer 75 also executes supervisory programs to perform check-up of the block sequence and operation of the I/O controller (interlock).

Referring to FIG. 6(c), when it is requested by the robot group control computer 75 to initiate execution of jobs for a basic operation block, each of the robot control computers 74 fetches step operations and teach data, for the basic operation block out of the memory at a step 122. At steps 123, 124, 125, 126, and 127, the robot control computer 74 recognizes a command of the step operation. When the command requests interlock with another robot, the I/O is executed to let the robot group control computer 75 perform the interlock. When the command requests execution of a single operation of a mobile axis drive mechanism or a hand, the robot control computer 74 supplies the intelligent amplifiers 71 with instruction containing speed of operation and amount of movement and supplies the I/O controller 72 with operation of the hand. When it confirms completion of operation of all of the intelligent amplifiers 71 and the operation of the I/O controller 72, the robot control computer 74 proceeds to recognition process of the next command requesting the step operation. This recognition process is executed for all of the step operations in the block in accordance with the numerical order assigned to all of the step operations. Upon completion of execution of all of the step operations in the block, the robot control computer 74 generates a task completion signal to be delivered to the robot group control computer 75, by which it is supervised at a step 128. The robot control computer 74 executes the supervisory program to perform check-up of teach data fetched at the step 122 and of operation (interlock) of the I/O. The robot control computer 74 also performs to check error signals generated by the intelligent amplifiers 71 and the I/O controller 72, diagnostic instructions to the diagnostic unit 73 and diagnostic result data therefrom.

Figure 7:
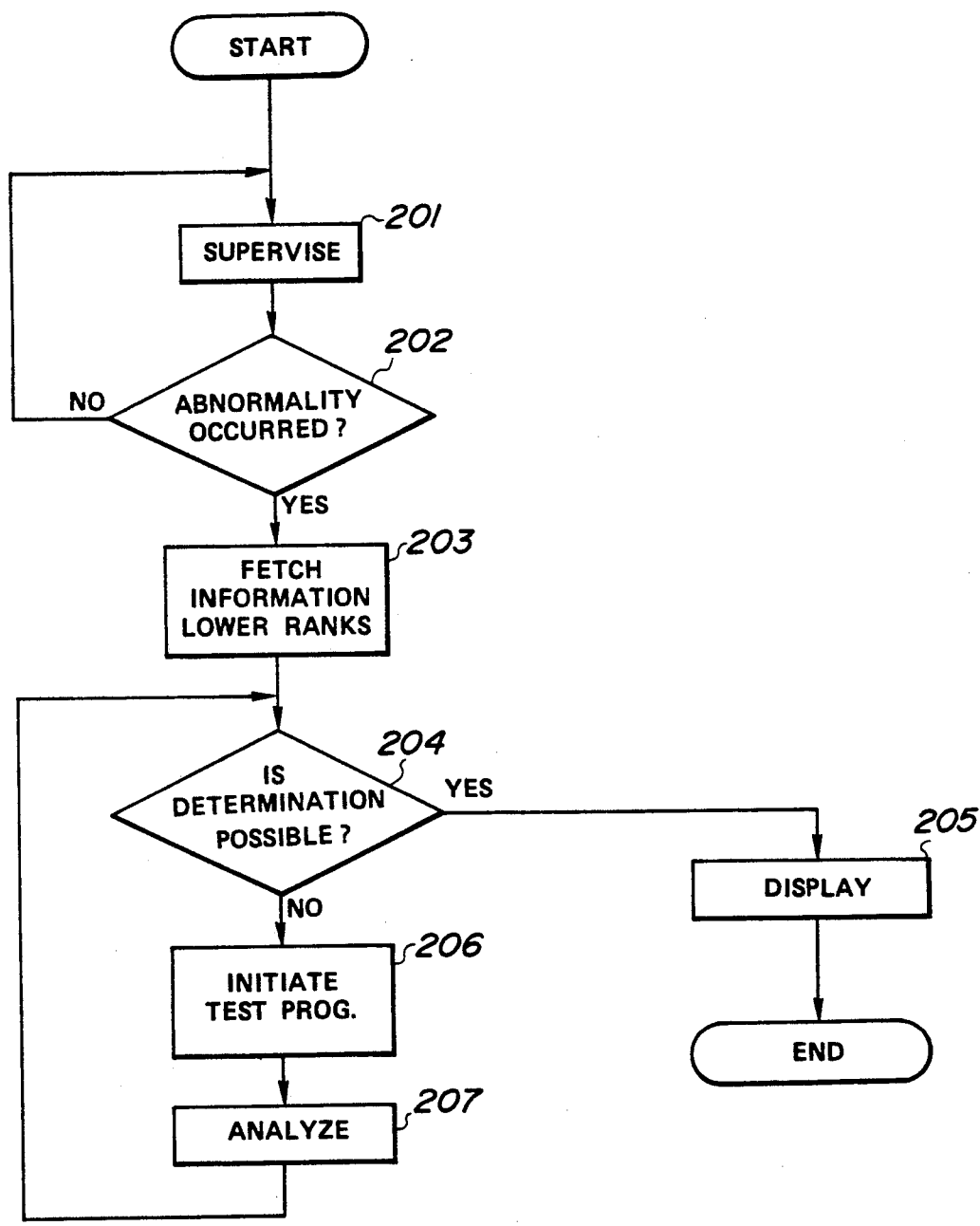
FIG. 7 is a flow diagram of a supervisory program.

During the process of assembly of the main body, the assembly control computer 76 executes the supervisory program as shown in FIG. 7, and keeps on performing the supervisory at steps 201 and 202. When one of the robot group control computers 75 stops its operation and generates an error signal, the control proceeds from the step 202 to a step 203. At the step 203, the assembly control computer 76 fetches data necessary for determining the location of the malfunction and the nature thereof, from the robot group computer 75 which generates the error signal. These data include processing error data from within the robot group computer 75 and other error data from the lower rank (such as malfunction indicative informations of the robot control computers 74, intelligent amplifiers 71 and I/O controllers 72). If, with the information fetched from the robot group computer 75, the assembly control computer 76 can locate where the malfunction has occurred or what the malfunction is, the control proceeds to a step 205 where the diagnostic results, namely the location of the malfunction and the nature thereof, are displayed.

If the above-mentioned error or malfunction informations are not sufficient for the assembly control robot 76 to determine the location and nature of the malfunction having occurred, the control proceeds from the step 204 to a step 206. At the step 206, the assembly control computer 76 requests at least one of the robot control computers 74 to initiate execution of a test program designed to gather information. Then, the control proceeds to a step 207 where the information gathered during a run of the test program is analyzed before the control returns to the step 204.

Figure 8:
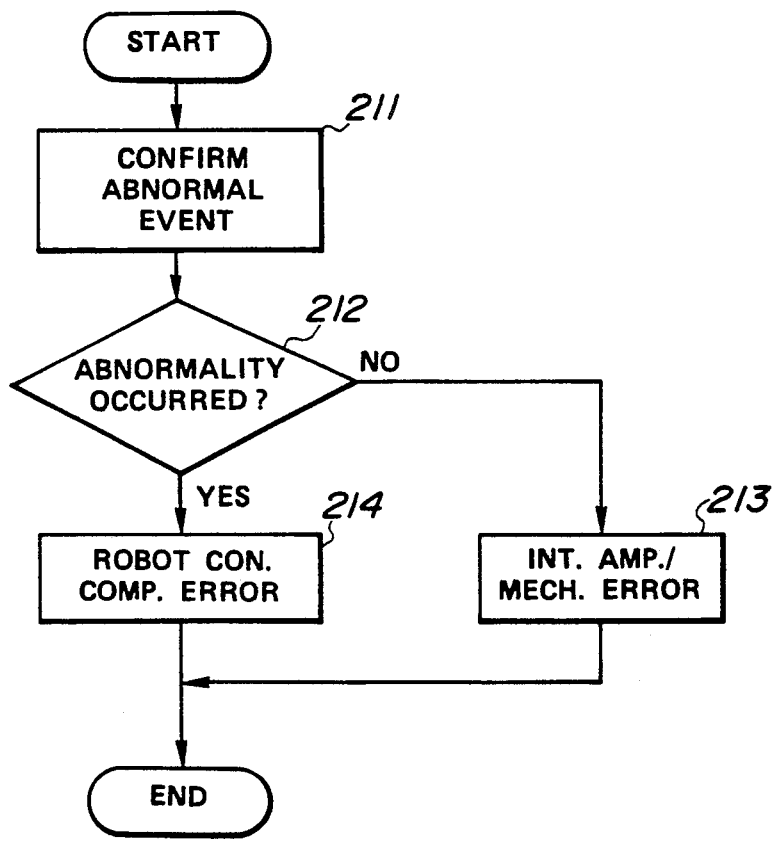
FIG. 8 is a flow diagram of a diagnostic program.

Assuming now that a predetermined one of the mobile drive mechanisms of a predetermined robot has come into trouble, the robot control computer 74 for this predetermined robot is requested to initiate execution of a test program as illustrated in FIG. 8.

Referring to FIG. 8, at a step 211, all of the mobile axis drive mechanisms of the robot are activated one after another under the same condition to confirm the occurrence of abnormal event. Then, at the subsequent step 212, when all of the mobile axis drive mechanisms are subject to abnormal events, respectively, it is determined that the instructions by the robot control computer 74 are abnormal. When the abnormal event occurs upon activating the predetermined mobile axis drive mechanism, only, it is determined that the mechanism of the predetermined mobile axis drive mechanism fails to operate normally or the intelligent amplifier 71 fails to operate normally at a step 213.

Figure 9A:
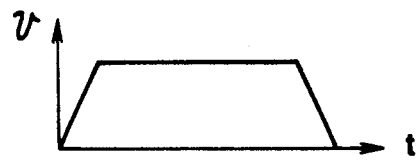
FIG. 9(a) illustrates a test pattern.
Figure 9B:
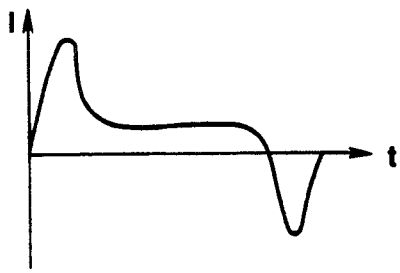
FIGS. 9(b) and 9(c) show two variation patterns of solenoid current during operation along with the test pattern in FIG. 9(a)

If the diagnosis indicates that either the mobile axis drive mechanism or the intelligent amplifier 71 is in trouble, the intelligent amplifier 71 is replaced with the new one, and the new intelligent amplifier 71 is requested to perform the instruction to operate the mobile axis drive mechanism in accordance with test patterns shown in FIGS. 9(a) and 9(b). In the test patterns, the vertical axis indicates the speed v, while the horizontal axis time t.

Figure 9C:
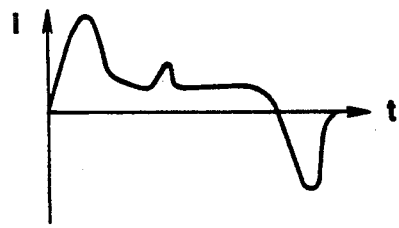
Figure 10A:
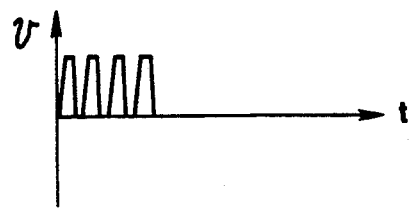
FIG. 10(a) illustrates another test pattern.
Figure 10B:
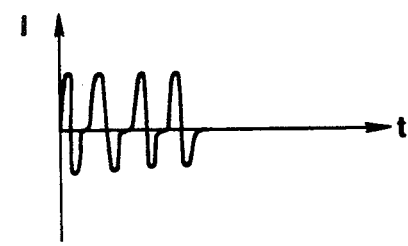
FIGS. 10(b) and 10(c) show two variation patterns of solenoid current during operation along with the test pattern in FIG. 10(a)
Figure 10C:
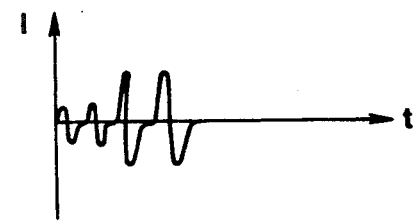

The solenoid current i varies in different patterns versus time t depending on whether the mobile axis drive mechanism operates normally or not. When, during operation along the test pattern as shown in FIG. 9(a), the solenoid current i varies in the pattern as shown by the fully drawn curve in FIG. 9(b), and when, during operation along the test pattern as shown in FIG. 10(a), the solenoid current i varies in the pattern as shown in FIG. 10(b), it is determined, as the diagnosis, that the mechanism is in the normal state. On the other hand, when the solenoid current i varies in the pattern as shown in FIG. 9(c) during the operation along with the test pattern as shown in FIG. 9(a), it is determined, as the diagnosis, that there is galling caused by degradation of the mechanical parts at the position where small positive peak appears. When the solenoid current i varies in the pattern as shown in FIG. 10(c) during operation along with the test pattern as shown in FIG. 10(a), it is determined, as the diagnosis, that the mechanism has a portion subject to no load owing to the increased backlash.

Figure 11:
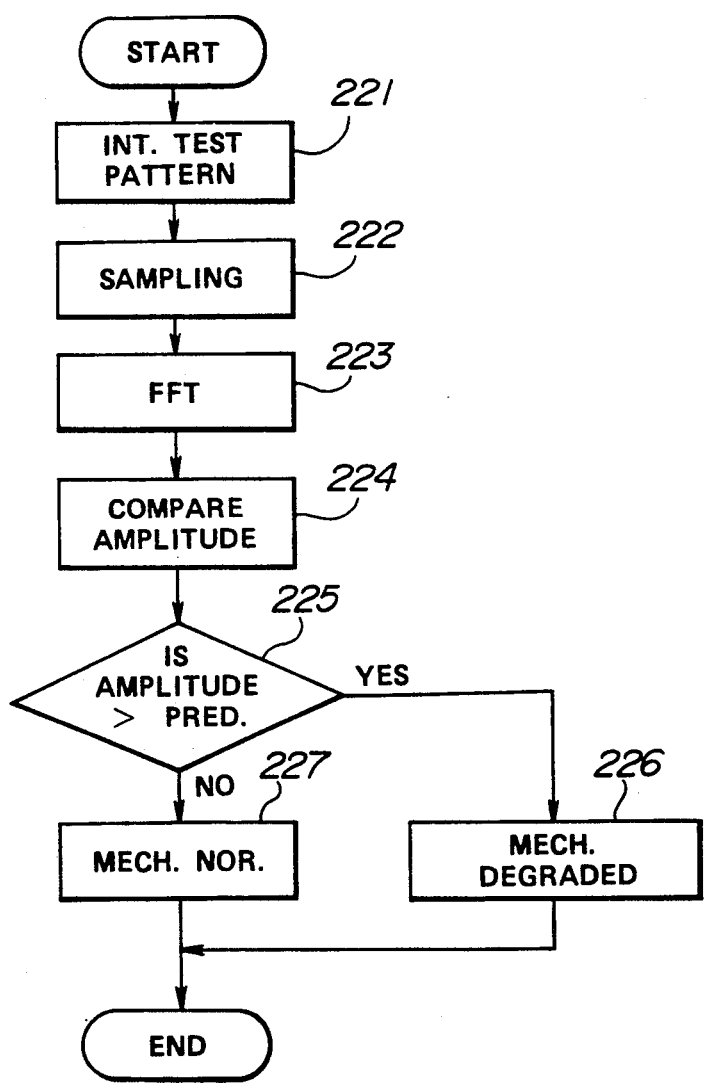
FIG. 11 is a flow diagram of diagnostic program.

In the case when there is not found any abnormal event in the mechanical portion and the intelligent amplifier 71 is deemed to operate normally, a test program as shown in FIG. 11 is executed.

According to this test program, the mobile axis drive mechanism is caused to operate along with a predetermined test pattern at a step 221. At the next step 222, the vibration data during this operation is obtained via a vibration sensor and a diagnostic unit and sampled. The sample data are subjected to fast Fourier transformation (FFT) at a step 223. At the next step 224, the amplitude at a particular frequency is compared with the normal amplitude at the same frequency. When the amplitude is far greater than the normal amplitude at a step 225, the control proceeds to a step 226 and it is determined that there occurs degradation. When the amplitude is within the normal range adjacent the normal amplitude, it is determined at a step 227 that the mechanical portion is in the normal state.

In the previously described embodiment, the serial data networks 74 used in all of the ranks of the control use the common protocol.

Figure 12:
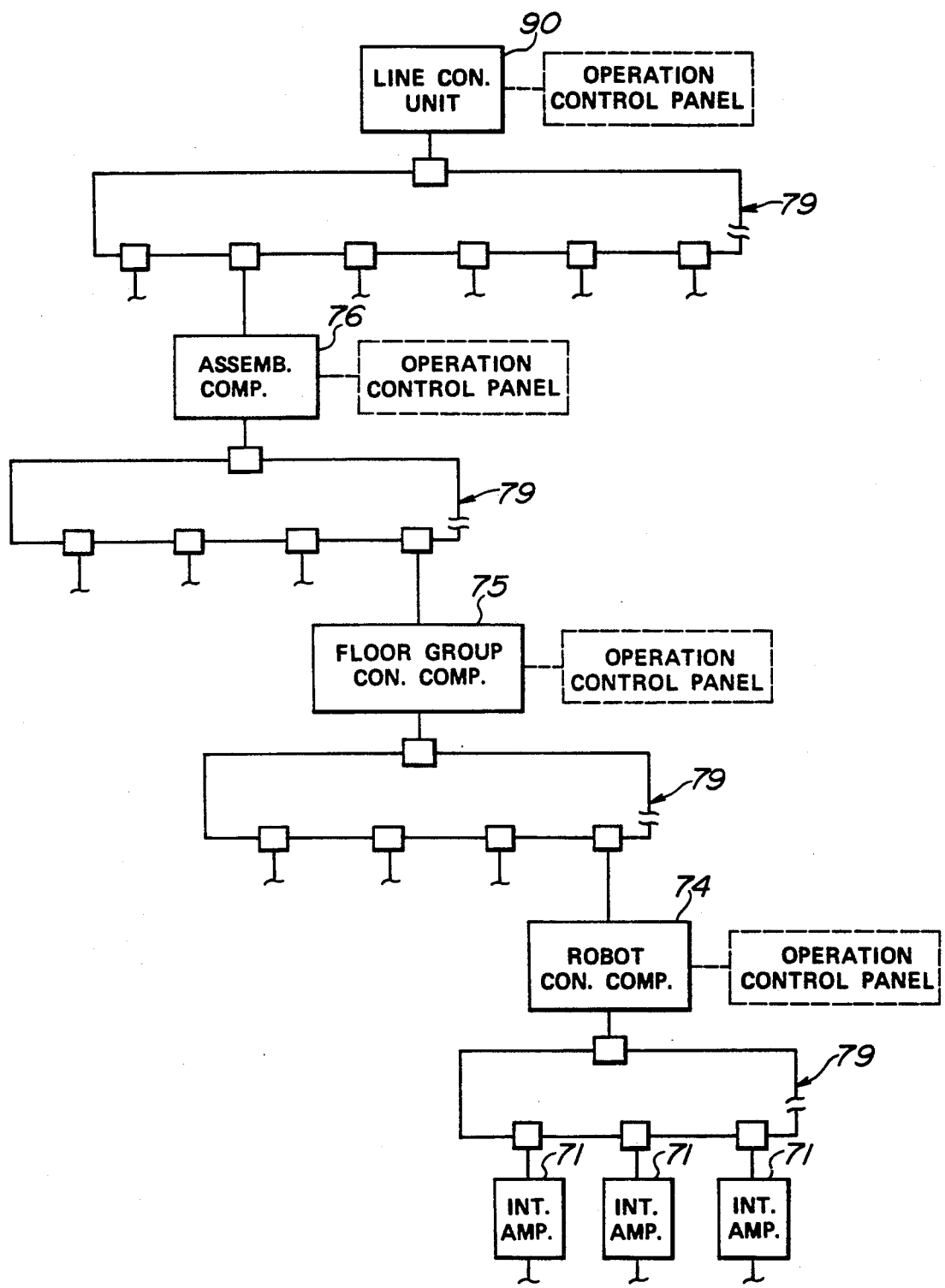
FIG. 12 is a fragementary block diagram of the second embodiment.

Referring to FIG. 12, a second embodiment is described. In this embodiment, the control according to this invention controls not only robots for the main body assembly station, but also robots for the other stations of the vehicle body assembly line. As will be readily understood from FIG. 12, all of the computers of the highest ranks of the hierarchical control structures for robots of a plurality of stations of the vehicle body assembly line are connected to a single vehicle body assembly line control unit via a serial data network 79.

Referring back to FIGS. 1 and 2, it is now described how to correct the position data stored in each of the robots serving as locators to position vehicle body panels. According to this method, during the assembling process of the main body, for each of such work positioning robot, a difference between an actual position when it has its hand to position the work and a target position is measured and a spring back force from the work which the robot is subjected to is measured. Based on these measured data on each of the positioning robots, the tolerances between component parts of the main body are indirectly detected and the assembling accuracy of the main body is indirectly detected. Based on the analysis of these measured data, the portion of the main body which has the inaccuracy can be determined and/or the robot which is responsible for this inaccuracy can be determined. Then, the position data stored in this robot can be corrected. Actually, the amount of spring back force is indirectly determined by analyzing the variation pattern of the solenoid current passing through the servo motor of each of the robots.

Referring to FIGS. 13 to 17, it is now described how to effect adjustment of each of the robots mounted on the frame after the frame has been set on the main body assembling stage of the vehicle body assembly line.

Figure 13:
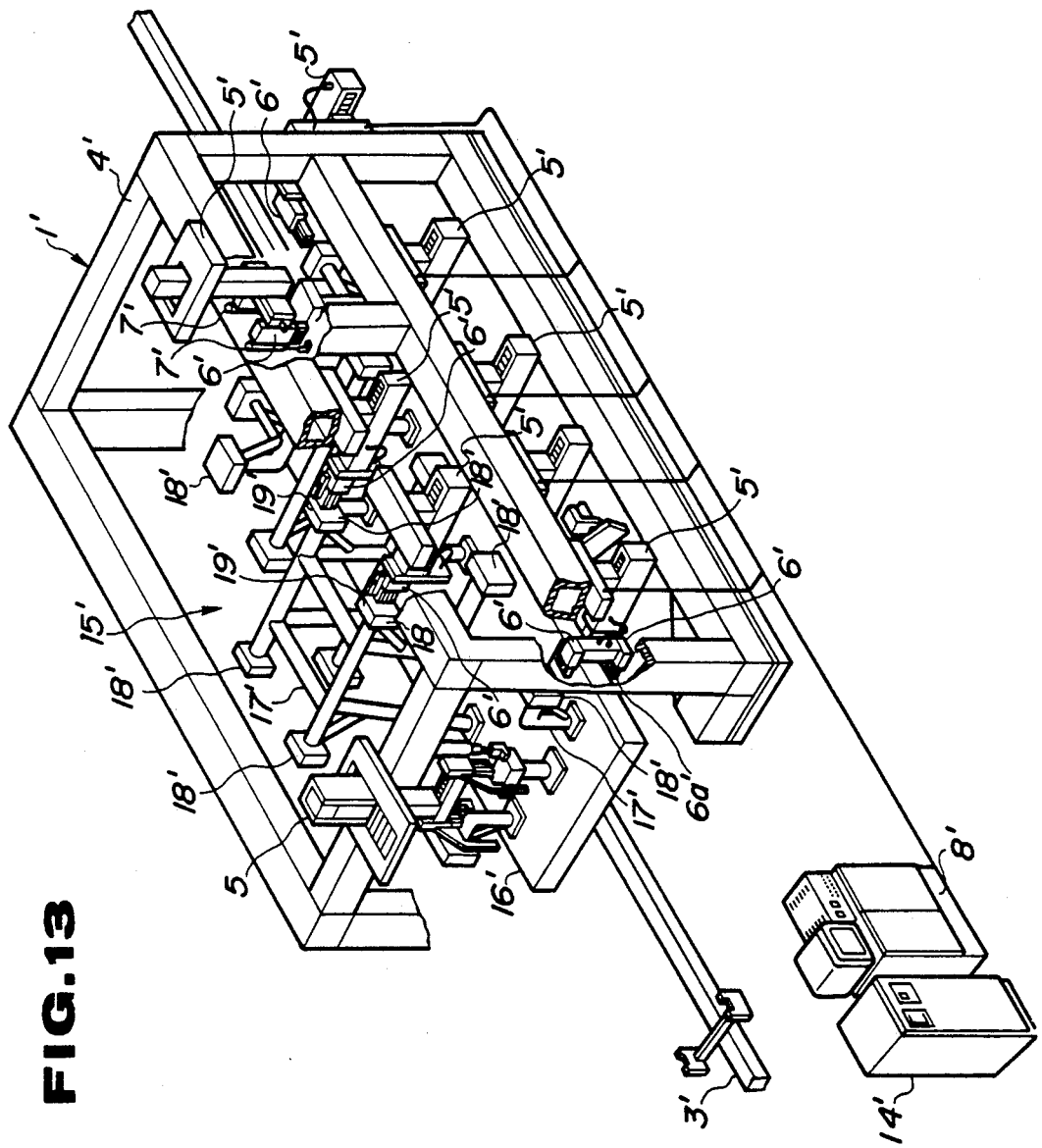
FIG. 13 is a perspective view of a main body assembling apparatus illustrating the manner of adjusting the positions of robots relative to the frame.
Figure 14:
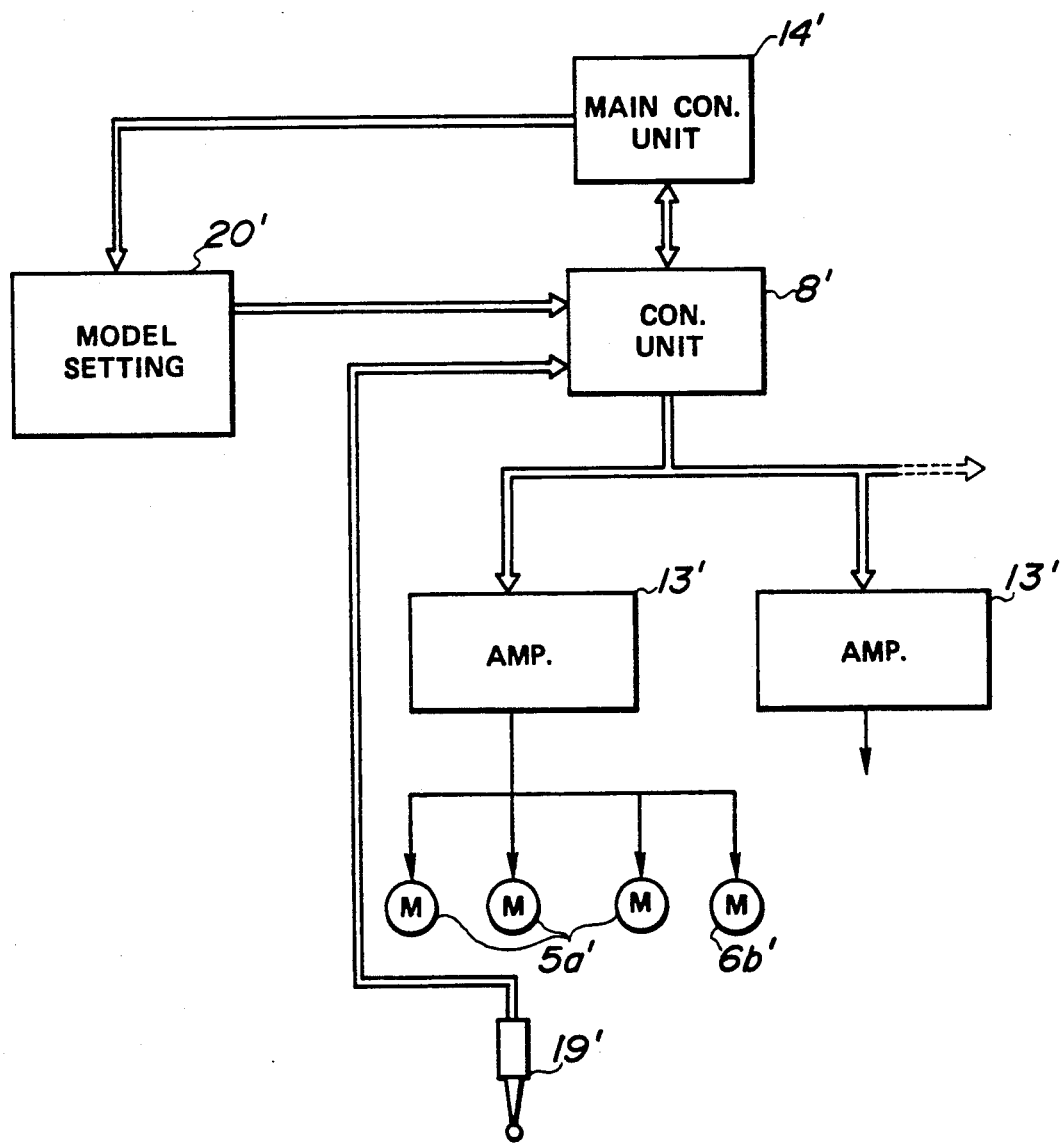
FIG. 14 is a block diagram of a control for the robots.

Referring to FIG. 13, the reference numeral 1' denotes generally an apparatus for position, as works, vehicle body panels, such as, a floor main panel, left and right side panels, a rear panel, a cowl top assembly, a shelf panel and the like, in order to hold them in position for the subsequent temporary welding. The work positioning apparatus 1' includes a frame 4', and a plurality of orthogonal type robots 5', each including, as its hand, one or a plurality of jig units 6'. In some circumstances, some of the robots may include a clamp 7' operated by an air cylinder. Some of the jig units 6' have gauge plate assembly 6a' whose contour can be modulated to cope with the shape of the work which it handles. The robots 5' are under control of a control unit 8' that is controlled by a main control unit 14'. As shown in FIG. 14, based on the instructions from the main control unit 14', the control unit 8' controls via amplifier units 13' servo motors 5a' provided for movement along three axes, a servo motor 6b for modulating the contour of the gauge plate assembly 6a', and the clamp 7'.

Describing how to install the apparatus 1' in the main body assembling stage of the vehicle body assembly line, firstly, the robots 5' are temporarily mounted on the frame 4' such that the three axes, namely, a X-axis, a Y-axis, and a Z-axis, generally agree with the three axes of the frame 4'. Then, this frame 4' with the robots 5' are fixedly secured to the main body assembling stage such that the three axes of the frame 4' generally agree with the three axes of this stage.

Then, using a shuttle bar or conveyer 3', a model 15' in inserted into the frame 4' and set in position by means of a model setting device 20' as shown in FIG. 14. The model 15' is removably fixed onto the stage by inserting a plurality of locate pins on the stage into a plurality of locate holes which a base 16' of the model 15' is formed with.

The model 15 has a plurality of blocks 18' on frames 17' mounted on the base 16'. As best be understood from FIG. 15, the block has three instrument planes 18a' extending in orthogonal relationship. The relative position of each of these planes 18a' of each block 18' to the adjacent locate hole are measured beforehand with good accuracy.

As shown in FIG. 15, a sensor 19' of the contact type is mounted on the jig unit 6' of each of the positioning robots 5' and connected with the control unit 8' as shown in FIG. 14.

The data regarding the positions of the instrument surfaces 18a' relative to the adjacent locate holes are predetermined and stored in the main control unit 14'.

Using this data, the correction data for each of the robots 5' are collected in the following manner.

Referring to FIG. 15, the robot 5' is actuated in accordance with stored control program to let the jig 6' and thus the sensor 19' move along the X-axis, Y-axis and X-axis of its own. Letting the probe of the sensor 19' contacting with all of the predetermined points 101' to 112', four on each of the instrument planes 18a (see FIG. 16), and stores the position data of the robot 5' correspondingly. In the process of moving the probe of sensor 19' from the point 101' to the point 102', as shown in FIG. 17, the robot 5' firstly moves in a path along the X-axis of its own until the probe of the sensor 19' contacts with the point 101', then the robot 5' moves back in the same path 114' along the X-axis, then moves in a path 115' along the Y-axis of its own, then moves in a path 116' along the X-axis until the probe of sensor 19' contacts with the point 102', and then moves back in a path 117' along the X-axis. The position data of the robot 5' are compared with the predetermined position data stored in the main control unit 14'. Based on the deviation resulting from this comparison, the position of the robot relative to the frame is adjusted, and then the above-mentioned metering process is repeated. The process is executed on all of the positioning robots 5'.

After the positions of all of the robots 5' relative to the frame have been corrected, the model 15 is removed.

In the above described manner, the positions of the robots 5' relative to the frame 4' after setting the apparatus to the stage can be adjusted and corrected with relatively short time.

What is claimed is:

1. A hierarchically controlled robot system comprising:

a supervisory control unit;

a plurality of group control units connected to said supervisory control unit, said group control units each having means for storing a set of robot instructions and outputting from said stored set in accordance with instructions from said supervisory control unit;

a plurality of robots, each including a plurality of arm positioning mechanisms for positioning said arm along respective paths, respective drive means operatively associated with a corresponding one of said arm positioning mechanisms for driving said corresponding arm positioning mechanisms along said respective paths, and a robot control unit for controlling said drive means operatively connected to said drive means, wherein said robot control units are divided into a plurality of respective groups, each respective group of the robot control units being connected to a corresponding one of the group control units, each robot control unit within each said group controlling corresponding arm positioning mechanisms in accordance with instructions output from the corresponding group control unit, said instructions being output in accordance with instructions from said supervisory control unit; and means for locating a malfunction occurring within at least one of said robots, said locating means including:

a diagnostic means, operatively connected to said at least one of said robots, for detecting the occurrence of any from among a predetermined group of error conditions within said robot and supplying a first signal indicative of any detected error condition to the robot control unit of said at least one of said robots;

means, on a group control unit connected to said robot control unit of said at least one of said robots, for generating and transmitting a second signal, indicative of said any detected error condition, to said supervisory control unit;

processing means within said supervisory control unit for reading, in response to said second signal, data associated with said at least one of said robots from the group control unit to which said robot is connected, and determining the location of said malfunction within said robot, utilizing information contained within said data.

2. An hierarchically controlled robot system according to claim 1 wherein said locating means further includes test means for controlling said plurality of robots in accordance with stored test instructions, means for monitoring the operation of said robots while executing said test instructions, means for generating signals indicative of said monitored operation, and means for determining the location of a malfunction within said robots based on said generated signals.

3. An hierarchically controlled robot system according to claim 1 wherein said predetermined group of error conditions includes either or both of a vibration and a mechanical strain being in excess of a predetermined magnitude.

4. A hierarchically controlled robot system comprising:

a plurality of robots, each robot having a positioning device including a jig unit with a gauge assembly adapted to mate with the shape of a work, a drive mechanism carrying said positioning device, a diagnostic unit including means for determining an actual position of said positioning device relative to said work and generating a diagnostic signal indicative of said determined actual position relative to said work and generating a diagnostic signal indicative of said determined actual position relative to said work and a robot control unit operatively connected to said positioning device, said drive mechanism and said diagnostic unit;

said plurality of robots being divided into a plurality of groups in accordance with a function which each of said plurality of robots is assigned to;

a plurality of group control units, each operatively connected to each of said plurality of groups;

a supervisory control unit operatively connected to said plurality of group control units;

said robot control unit of each of said plurality of robots receiving said diagnostic signal from said diagnostic unit operatively connected to and transmitting said diagnostic signal to said group control unit operatively connected thereto and to said supervisory control unit;

said supervisory control unit and said plurality of group control units cooperating with each other to correct the position of said positioning device of each of said plurality of robots relative to said work in response to said diagnostic signal.

5. An hierarchically controlled robot system as claimed in claim 4, wherein said diagnostic unit of each of said plurality of robots includes sensor means for detecting mechanical contact of said positioning device with said work.

* * * * *